United States Patent
Siebol

[15] 3,657,957
[45] Apr. 25, 1972

[54] RIVET

[72] Inventor: George Siebol, Orange, Calif.

[73] Assignee: Olympic Screw & Rivet Corporation, Downey, Calif.

[22] Filed: Nov. 24, 1969

[21] Appl. No.: 879,201

[52] U.S. Cl. ................................................................85/77
[51] Int. Cl. ......................................................F16b 13/06
[58] Field of Search......................85/77, 78, 16, 10 F, 37; 148/12.4, 11.5

[56] References Cited

UNITED STATES PATENTS

| 2,294,413 | 9/1942 | Marshall | 29/HTRE |
|---|---|---|---|
| 2,501,567 | 3/1950 | Huck | 85/78 |
| 2,546,602 | 3/1951 | Kenting | 85/78 |
| 3,148,578 | 9/1964 | Gapp | 85/77 |
| 3,285,121 | 11/1966 | Siebol | 85/78 |
| 3,301,120 | 1/1967 | Loyd | 148/12.4 |
| 3,377,908 | 4/1968 | Stau et al. | 85/78 |

FOREIGN PATENTS OR APPLICATIONS

| 163,108 | 5/1955 | Australia | 85/78 |
|---|---|---|---|
| 472,329 | 9/1937 | Great Britain | 85/77 |

*Primary Examiner*—Marion Parsons, Jr.
*Attorney*—Fulwider, Patton, Rieber, Lee & Utecht

[57] ABSTRACT

A blind rivet comprising a headed sleeve telescoped onto a setting pin having a pulling section projecting beyond the headed end of the sleeve and an expansion section projecting beyond the other end of the sleeve with an expanding and locking head on the end of the expansion section. The expanding and locking head of the pin has a core of high tensile strength and a relatively soft and ductile peripheral layer of lower tensile strength. After the rivet is set in two side-by-side workpieces from one side of the latter, the expanding and locking head is drawn into the sleeve to form an expanded, bulb-shaped head on the sleeve. The soft peripheral layer of the pin yields to bulge the sleeve into bearing contact with the adjacent workpiece with a controlled force avoiding tearing or splitting of the work despite variations in total thickness thereof. A first alternative expanding and locking head has a central cut-out forming a weakening recess, and a second alternative has a similar cut-out with an inturned flange partially closing the recess.

A method of making the foregoing rivet including the steps of forming a hardened head on the setting pin by cold working the head, peripherally heating the head while confining the heat substantially to the peripheral layer, and rapidly cooling the head before the heat penetrates the hardened core thereof. A tapered shoulder on the expansion section is hardened by cold working after the treatment of the head is completed.

17 Claims, 8 Drawing Figures

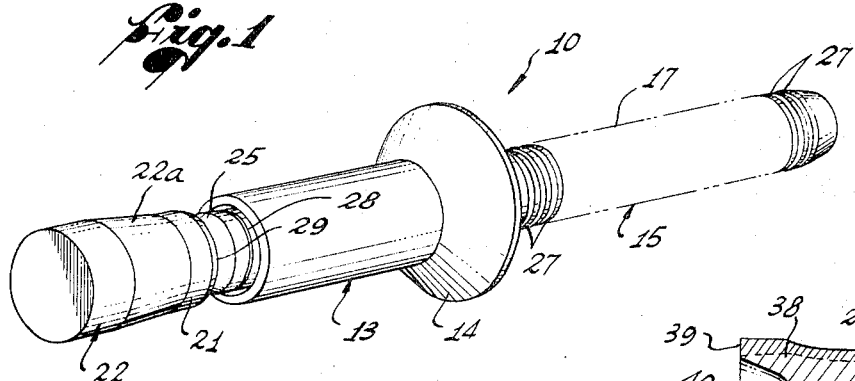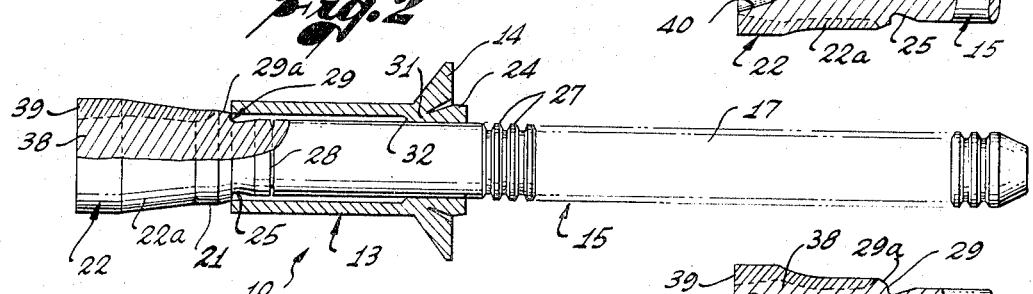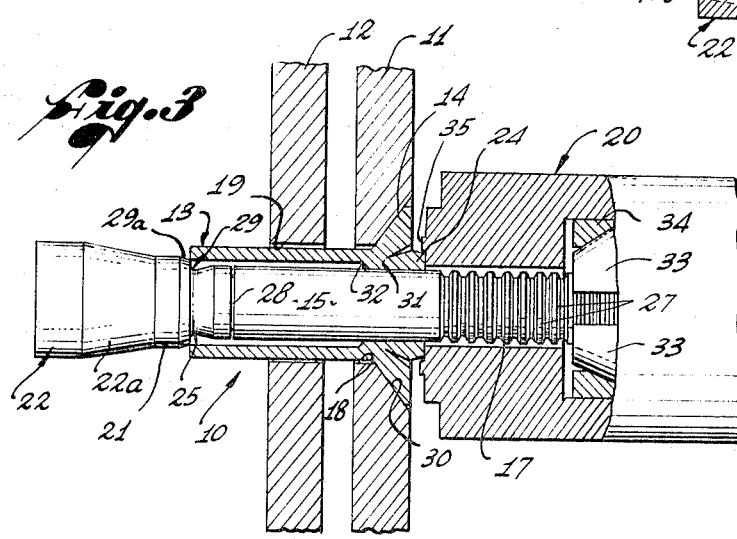

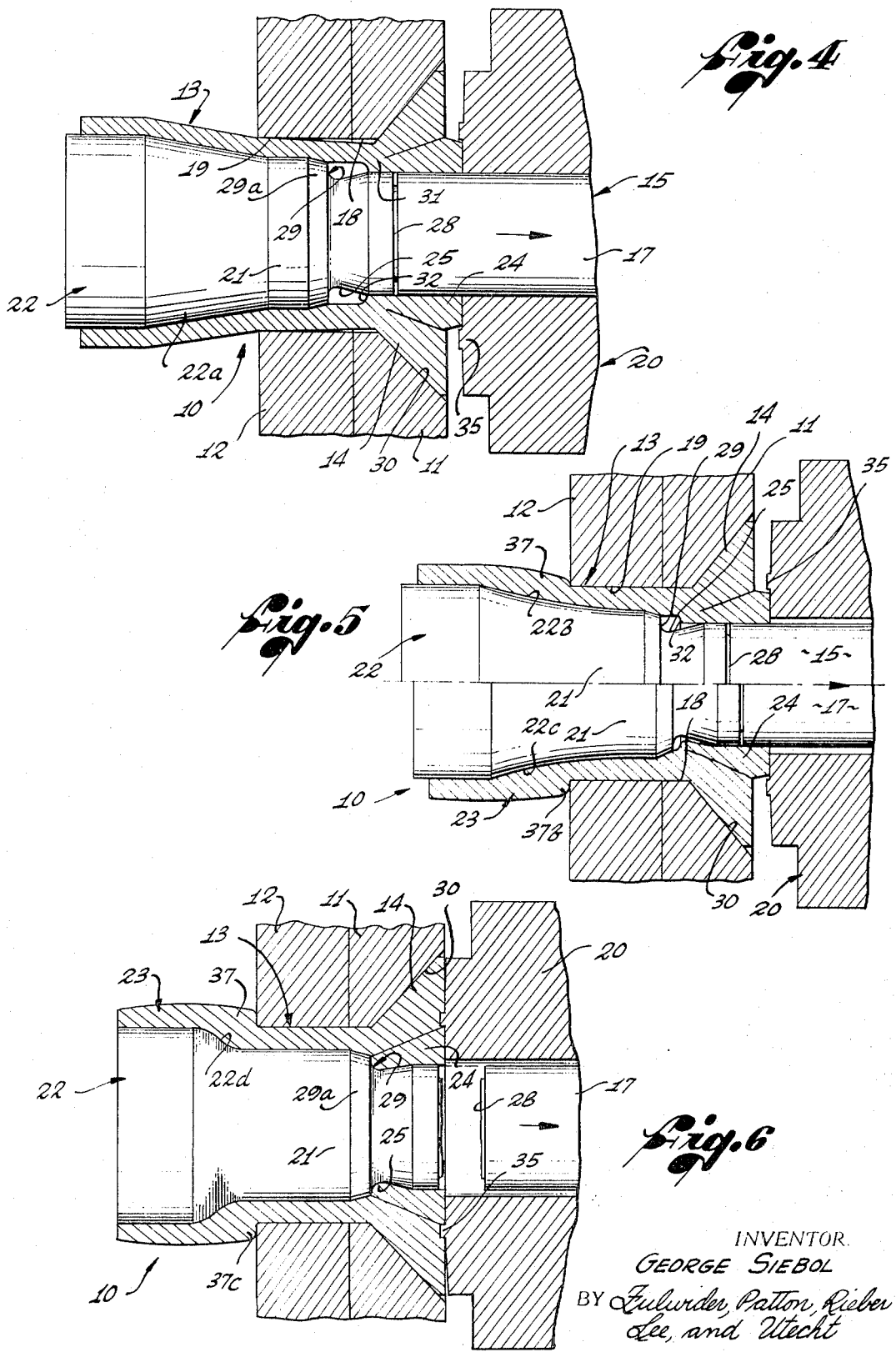

RIVET

BACKGROUND OF THE INVENTION

The present invention relates to rivets and, more particularly, to a so-called blind rivet especially adapted for the riveting of side-by-side workpieces where access is convenient from only one side of the workpieces. The side of the work from which the rivet is applied is referred to as the front or "access" side and will be so referred to herein. The other side is called the rear or "blind" side.

A blind rivet of the general type to which the present invention relates is described in U.S. Pat. No. 3,285,121 wherein it will be seen that a headed sleeve is telescoped over, and positioned on, an elongated and specially formed setting pin having a pulling section projecting beyond the headed end of the sleeve and an expansion section projecting beyond the opposite end of the sleeve with an expanding and locking head on the free end of the expansion section. This head typically has a taper on the end adjacent the expansion section and the sleeve.

With its two basic parts in this telescoped relation, the rivet is inserted, from the access side of the workpieces that are to be riveted, into aligned holes in the workpieces, and is positioned with the head of the sleeve adjacent the access side and with the locking head and the expansion section of the setting pin adjacent the blind side. Then the pin is pulled from the access side while the sleeve is held against movement in the opposite direction from the same side to draw the expansion section and the head of the pin into the blind-side end of the sleeve, first clinching the workpiece together and expanding the sleeve to fill the holes in the workpieces, and then forming a head on the sleeve on the blind side of the riveted joint. As the setting operation is completed, a locking crown disposed around the setting pin within the sleeve head on the access side is swaged into a locking groove in the pin, and the pulling section of the pin is broken off substantially flush with the sleeve head.

In this manner, the workpieces are clinched together and subsequently held between the heads on the opposite ends of the sleeve. The tightness and fatigue life of each joint depend upon both the tensile and shear strengths of the rivet and the amount of bearing area that can be developed between the expanded, blind-side head and the blind-side workpiece without splitting or tearing the latter. In many cases, the overall thickness, or grip length, of such a joint is subject to substantial variations caused by variations in permissible tolerances for the workpiece thicknesses, and the blind-side workpiece may have relatively low bearing strength. Thus, the amount of bearing area that can be developed with conventional blind rivets, without danger of splitting or tearing the rivet sleeve or the work, has been limited.

SUMMARY OF THE INVENTION

The present invention resides in a novel blind rivet with which a greater blind-side bearing area is obtained despite variations in grip length and low bearing strength of the blind-side workpiece, thereby to increase the strength and fatigue life of the riveted joint while materially reducing the danger of damage to the blind-side workpiece or damage to the rivet sleeve during riveting. The locking head which expands the sleeve to form the blind-side head thereon comprises a central core of high tensile strength and a relatively soft and ductile peripheral layer of lower tensile strength for engagement with the interior of the sleeve during formation of the blind-side sleeve head. The central core provides the necessary strength for maintaining a tight joint, and the peripheral layer is more readily deformable so as to be wire-drawn as the blind-side head is formed, thereby to accommodate variations in the grip length and avoid damage to the sleeve and work.

In the preferred embodiment of the rivet, and using the method of the present invention, at least the expanding and locking head of the setting pin is initially hard or hardened during formation, and the peripheral portion of this head subsequently is annealed to the softer condition, preferably by high-frequency induction heating which, by its skin effect, is limited to the zone adjacent the periphery of the head. Then the pin is cooled relatively quickly to insure that the heat does not penetrate into the core, thereby maintaining the core in its hardened condition with relatively high tensile strength. In this manner, a compromise is achieved between the conflicting objectives of providing a soft and deformable head and of maintaining high tensile strength. A relatively hard shoulder is provided on the expansion section, preferably by cold-working the shoulder after the annealing has been completed.

Under some circumstances, it is also desirable to anneal the end portion of the sleeve to facilitate the formation of the blind-side head thereon, and the preferred form of the setting pin also may be modified by cutting out the end of the hardened core to weaken the end of the peripheral layer and reduce the tendency to split out the end of the sleeve during formation of the head. One alternative form of the head has an outwardly flaring taper and an open, weakening recess with a rounded inner end, and a second alternative is similar except for an inturned annular flange around the recess adjacent the end of the pin, partially closing the end of the recess and resisting radial deformation of the extreme end portion of the pin.

Other objects and features of the invention will be apparent from the following detailed description, taken in conjunction with the accompanying drawings.

BRIEF DESCRIPTION OF THE DRAWINGS

FIG. 1 is a perspective view of a blind rivet embodying the novel features of the present invention;

FIG. 2 is a longitudinal sectional view through the blind rivet with the setting pin shown primarily in elevation but partly broken away and shown in section;

FIG. 2a is a partial sectional view of the expanding and locking head of an alternate form of the setting pin;

FIG. 2b is a partial sectional view similar to FIG. 2a and showing a second alternative form of the setting pin;

FIG. 3 is a longitudinal sectional view, with the pin in elevation, of the rivet passed through aligned holes in spaced workpieces and having a tool head connected to the pulling section of the setting pin;

FIG. 4 is an enlarged partial sectional view of the rivet in the process of being set, after the workpieces have been clinched into tight engagement;

FIG. 5 is a split longitudinal section similar to FIG. 4 showing two different intermediate conditions of the parts during the setting process above and below the centerline; and FIG. 6 is a sectional view similar to FIGS. 4 and 5 showing the completed rivet with the pulling section separated from the remainder thereof.

DETAILED DESCRIPTION

As shown in the drawings for purposes of illustration, the invention is embodied in a blind rivet 10 of the general type disclosed in the aforesaid patent, for joining two side!-by-side workpieces such as substantially flat plates 11 and 12 when access is convenient from only one side of the plates, the right side as viewed in FIGS. 3-6. For this purpose, the rivet comprises two main parts, a tubular sleeve 13 having a preformed head 14 on its right or access-side end, and a setting pin 15 extending through the sleeve and positioned relative thereto with the right-end portion of the pin projecting to the right beyond the sleeve head to form a pulling action 17, and with the opposite end portion projecting to the left beyond the left end of the sleeve. The sleeve and the setting pin may be formed of a variety of materials, examples of which are aluminum alloy and steel, the preferred materials having the properties of work hardening and of annealing with heat.

To secure the plates 11 and 12 together, the rivet 10 is inserted in a pair of oversize, aligned holes 18 and 19 in the plates, from the access side of the latter, and is positioned relative to the plates with the sleeve 13 extending through the aligned holes, the sleeve head 14 adjacent the right side of the plate 11, and the left end portion of the setting pin 15 projecting beyond the blind side of the left plate 12. Then the pin is pulled to the right by a suitable tool head 20 while the sleeve and the right plate are pushed to the left. On the left end portion of the setting pin are an expansion section 21 for expanding the sleeve within the holes as the pin moves to the left through the sleeve, and also a head 22 for expanding the portion of the sleeve beyond the left plate 12 in order to form a blind-side head 23 (FIGS. 5 and 6) on the sleeve bearing against the blind-side plate 12. In a conventional manner, the riveted joint is completed by pressing a locking crown 24 integral with the sleeve head 14 into an annular locking groove 25 in the setting pin 15, and then snapping the pin off substantially flush with the access side of the joint.

More specifically, the illustrative setting pin 15 comprises an elongated piece of wire stock which preferably is of the same initial diameter as the expansion section 21, which herein is cylindrical. At its left end, the pin is cold-worked in a header to form the head 22, and the right end portion is cold-worked to a reduced diameter, that is, a diameter smaller than the expansion section 21. This diameter also is smaller than the inside diameter of the sleeve 13.

In its final configuration, the pin 15 has, from right to left, a series of closely spaced peripheral grooves 27 in the projecting portion of the pulling section 17 facilitating gripping of the pin by the tool head 20, a weakening or "breakneck" groove 28 inside the sleeve and determining the eventual break-off plane of the pin, the locking groove 25 initially disposed adjacent the left end of the sleeve, and a shoulder 29 on the right or leading end of the expansion section 21 where the diameter of the pin increases to a diameter greater than the inside diameter of the sleeve. The radially outer portion 29a of this shoulder is tapered to the right and work hardened to facilitate entry of the expansion section into the sleeve 13 and the right end portion 22a of the head 22 has a similar taper from the maximum diameter, cylindrical portion of the head to the diameter of the expansion section to facilitate entry of the head into the sleeve.

Herein, the head 14 on the right end of the sleeve 13 is frusto-conical and is recessed into a countersink 30 in the access side of the right place 11 so as to be substantially flush with this plate. The locking crown 24, which also is generally frusto-conical, is partially sheared out of the central portion of the head and remains integrally joined thereto at 31 around the interior of the sleeve, the interior being reduced in diameter inside the sleeve head to form an annular internal stop shoulder 32 facing toward the left where the reduction in diameter occurs. The outside diameter of the sleeve is somewhat smaller than the holes 18 and 19 in the work plates so that clearance remains around the sleeve after the rivet 10 has been inserted and before it is set.

Preparatory to the setting operation, the pulling section 17 of the pin 15 is gripped in the tool head 20 between a plurality of angularly spaced jaws 33 (FIG. 3) which are cammed into tight gripping engagement with the pin by a pulling ring 34. As a pulling force is applied by this ring, an oppositely directed reactive force is applied to the locking crown 24 by the left end of the tool head, the crown being restrained against lateral displacement by an encircling annular rib 35 on the tool head. Thus, the sleeve head 14 is seated firmly in the countersink 30 as the setting pin is pulled to the right.

As the hardened shoulder 29 on the right end of the expansion section 21 enters and moves along the sleeve 13, an expansion wave is set up along the sleeve and progresses toward the blind side of the plate 12. Upon engaging this plate, the expansion wave shifts the plate to the right and cooperates with the tool head in clinching the two plates tightly together. The expansion section then is pulled into the portion of the sleeve inside the clinched plates (see FIG. 4), and expands the sleeve into tight engagement with the walls of the two holes 18 and 19. At the same time, the expanding head 22 is drawn into the sleeve to continue expanding the blind end portion thereof in order to form the blind-side head 23 of the rivet.

Just before the hardened shoulder 29 reaches the opposed stop shoulder 32, the taper 22a of the expanding and locking head 22 further expands the projecting end portion of the sleeve to bulge the sleeve at 37 (FIG. 5) into a "bulb" shape for bearing contact with the blind side of the work, the object being to obtain a substantial bearing area for reduced unit pressure in response to forces tending to spread the plates. As the formation of the bulb-shaped head is completed, the hardened shoulder 29 engages the stop shoulder 32, thus sharply increasing the resistance to movement of the pin 15 through the sleeve 13. The increased forces first act to swage the locking crown 24 into the now-aligned locking groove 25, as shown in FIGS. 5 and 6, and then to snap off the setting pin at the breakneck groove 28.

It has been recognized that elongation is likely to occur in the left end portion of the setting pin 15 during the final stages of the setting operation, by a wire-drawing effect, and that such elongation, and the accompanying reduction in diameter of portions of the pin, accommodate variations in grip length resulting from variations in the combined thicknesses of the clinched plates 11 and 12. In conventional rivets of this type, however, the need for relatively high tensile strength has raised practical limitations with respect to the permissible amount of wire-drawing that can be obtained.

In accordance with the present invention, the rivet 10 is formed with an expanding and locking head 22 that has a central core 38 (see FIG. 2) of high tensile strength and a relatively soft and ductile peripheral layer 39 of substantially lower tensile strength fast on the core for expanding engagement with the interior of the sleeve 13 during formation of the blind-side head 23 on the sleeve. The core provides the necessary tensile strength for the rivet, and is sized to be drawn relatively freely into the blind-side plate 12, while the peripheral layer is made more readily deformable to be wire drawn to varying degrees with variations in grip length. Accordingly, the novel rivet assures the formation of adequate bearing area between the blind-side head and the blind-side plate by controlling the expanding force that is applied to the interior of the sleeve.

In this instance, the zones of different hardness and ductility are obtained by work hardening the entire expanding and locking head 22 during the cold-heading operation in which the head is formed, and subsequently annealing only the peripheral layer 39 to soften this portion of the head. In the preferred method of annealing, the peripheral layer is band heated from the shoulder 29 to the left end of the pin (see FIG. 2) by means of high-frequency induction heating which, by its skin effect, is confined primarily to the peripheral layer. After being heated to the annealing temperature, the peripheral layer is cooled rapidly to prevent penetration of the heat into the previously hardened core 38.

Of course, there will not be a sharp cut-off between the heated and unheated zones. Instead, there is a progressive inward reduction in the temperature to which the peripheral layer is heated and, therefore, a progressive increase in hardness in the transition area between the two zones, ranging from maximum softness and minimum tensile strength adjacent the periphery of the head to the maximum hardness and tensile strength in the central zone forming the core of the head, the two zones being integrally joined and substantially concentric when heat has been uniformly applied around the head.

While the depth of the annealed peripheral layer 39 is not critical, it will be evident to those skilled in the art that optimum tensile strength is obtained by making the hard core as large as possible, commensurate with the eventual formation of sufficient bearing area between the blind-side head 23 and the blind-side plate 12. By way of example only, the depth of annealing may be on the order of 0.015 of an inch in a 3/16 inch rivet. It will be seen in FIG. 2 that this reduces the diameter of the hardened portion of the head to a size equal to, or somewhat smaller than the internal diameter of the sleeve. An illustrative initial tensile strength, substantially retained in the core 39, is 80,000 psi, the tensile strength of the peripheral layer being reduced to about one-half that amount by the annealing operation.

Shown in FIG. 2a is a modified form of the setting pin in which the expanding and locking head has a cut-out 40 in its left or blind-side end for weakening the cylindrical portion of the head and promoting inward collapse thereof in the final stages of the rivet-setting operation. This modification, in which similar parts are indicated with the same reference numbers used in the first form, may be used when it is anticipated that full expansion of the sleeve 13 may cause splitting of the blind-side end thereof. It will be noted that the inner end 40a of the cut-out 40 is rounded to distribute stresses within the head, and that the annealed taper 22a is modified to flare outwardly toward the cylindrical portion of the head, a feature which progressively increases the slope of the taper and thus correspondingly increases the interference between the head and the sleeve during setting of the rivet.

A second alternative, shown in FIG. 2b, is the same as the first alternative of FIG. 2a except for the addition of an annular, inturned shoulder or flange 40b around the extreme end portion of the weakening recess 40, this flange being integral with the head 22 and being formed, for example, by heading in the end of the pin around the recess. The flange thus partially closes the end of the recess and effectively increases the thickness of the head adjacent its end to increase the strength or hoop tension in this area sufficiently to resist collapse of the end of the head during setting of the rivet. The area surrounding the inner end portion of the weakening recess, between the flange 40b and the rounded inner end 40a, is collapsible inwardly in substantially the same manner as in the head of FIG. 2a.

Annealing of the end of the sleeve to increase its ductility is another alternative that will reduce its tendency to split. Whether any of these alternatives are desirable depends, however, upon the characteristics of the particular head and sleeve used.

In the manner previously described, during the initial relative movement between the setting pin 15 and the sleeve 13, the hardened shoulder 29 on the right end of the expansion section 21 is drawn into the sleeve and sets up the expansion wave that moves along the sleeve with the shoulder and abuts against the blind-side plate 12 to clinch the latter against the access-side plate 11. As clinching is completed, the hardened shoulder is drawn into the portion of the sleeve inside the blind-side plate (see FIG. 4), continuing to expand the sleeve until it is in tight engagement with both of the plates.

At the same time, the taper 22a of the pin head 22 is drawn into the projecting end of the sleeve 13 and expands the projecting end portion to the shape shown in FIG. 4, conforming generally to the taper and the cylindrical portion of the head. As the taper enters the portion of the sleeve that is confined within the blind-side plate 12, resistance to further expansion of this portion of the sleeve increases substantially, with the result that the softened peripheral layer 39 around the hard core 38 of the head begins to be wire drawn and elongated as the rivet-setting motion continues.

FIG. 5 illustrates two intermediate stages of wire-drawing and head-forming, the head 23 being bulged outwardly adjacent the blind-side plate and the taper 22a being drawn to a smooth, outwardly flaring configuration indicated at 22b in the upper portion of FIG. 5. It will be noted that the hardened shoulder 29 of the expansion section 21 is spaced from the stop shoulder 32 in the sleeve, the amount of this spacing being virtually the same as the remaining amount of relative axial motion between the setting pin and the sleeve.

During this remaining motion, the head 22 is drawn progressively into the sleeve 13, as shown in the lower portion of FIG. 5 and in FIG. 6, and the wire-drawing action continues as the taper is deformed first to the deeper flare shown at 22c in FIG. 5 and then substantially to the configuration shown at 22d in FIG. 6. It will be seen that the leading portion of the taper is drawn to a substantially cylindrical form of approximately the same diameter as the expansion section 21, while the trailing portion of the taper forms a relatively steep annular shoulder which is composed of metal of the ductile peripheral layer 39. This shoulder serves as a yieldable abutment for swaging the adjacent portion of the sleeve outwardly and toward the blind-side plate 12 to form the bulge 37 with a substantial area in bearing contact with the plate. This shoulder is formed progressively from the conditions shown at 37a and 37b in FIG. 5 to the final shape shown at 37c in FIG. 6.

The expanded head 23 is completed as the stop shoulder 32 engages the hardened shoulder 29 to terminate relative motion between the sleeve 13 and the pin 15. It should be noted, however, that the wire-drawn shoulder 22d remains yieldable to accommodate differing grip lengths, and can bulge to a greater or lesser extent if the joint is thicker thinner, respectively. In either event, the sleeve head 23 is bulged into firm bearing contact with the blind-side plate 12 by the annealed peripheral layer of softened material without applying the greater and less yieldable expanding forces that would be applied by a pin head composed entirely of the hardened core material. At the same time, the tensile strength of the rivet itself remains at a relatively high level determined primarily by the tensile strength of the core.

Since the shoulder 29 of the expansion section 21 is close to the annealed portion of the setting pin 15, and thus is likely to be heated and annealed to some extent during the annealing of the head 22, the shoulder should be formed by cold working after the annealing has been completed. This insures that the shoulder will be sufficiently hard to perform the initial expansion without significant deformation and subsequently to cooperate with the stop shoulder 32 in terminating relative motion when the pin and the sleeve are in the desired positions for snapping off of the pin.

As shown in FIG. 6 and described in detail in the aforesaid patent, such snapping off occurs after the opposed shoulders 29 and 32 are in firm engagement and the reactive force between the tool head 20 and the locking crown 24 has swaged the crown to left and inwardly into the locking groove 25 in the setting pin 15, the finished condition being shown in FIG. 6 after the pin has been snapped off at the breakneck groove 28. With the readily deformable peripheral layer 39 on the locking head 22, the break-off plane is reliably positioned substantially flush with the head 14 of the sleeve 13.

From the foregoing, it will be evident that the present invention provides a novel blind rivet and method of making the same that make it practical to obtain substantially greater blind-side bearing area for the rivet despite variations in the total thickness or grip length of the joint and without danger of splitting of the sleeve or the tearing or splitting the blind-side workpiece as a result of excessive expanding forces applied to a low bearing strength workpiece. Moreover, these important advantages are obtained without significantly increased manufacturing cost by annealing only the periphery of material of the setting pin head to produce a softened peripheral layer surrounding a work-hardened, high tensile strength core. It also will be evident that, while a particular embodiment has been illustrated and described, various modifications may be made within the spirit and scope of the invention.

I claim:

1. In a blind rivet for joining two side-by-side workpieces having aligned holes for receiving said rivet, and including a tubular sleeve having a head on one end for engaging one side of the work, a setting pin telescoped in said sleeve with a pulling section projecting beyond said one end and an expanding and a locking head positioned beyond the other end of the sleeve to be drawn into the sleeve to expand the latter into a second head for abutting against the other side of the work, the improvement comprising:

a hard core of material of relatively high tensile strength extending through said locking head;

and a peripheral layer of relatively soft and ductile material disposed around and fast on said hard core, said peripheral layer being tapered toward said other end to enter the sleeve and be wire drawn while expanding the sleeve to form said second head;

said pin having an expansion section between said expanding and locking head and said other end of said sleeve with a tapered shoulder for entering the sleeve and initially expanding the same, said shoulder having a hardness greater than that of the peripheral layer to expand the sleeve without substantial deformation of the shoulder, and said peripheral layer covering all of the sleeve-contacting area of the pin which lies axially beyond the expansion section toward the terminal end of said expanding and locking head and which is disposed within the workpiece holes after the pin is drawn into the sleeve.

2. The improvement defined in claim 1 in which said peripheral layer and said core are composed of the same metal, and are integrally joined and treated to different hardnesses.

3. The improvement defined in claim 2 in which said locking head is work hardened during formation and said peripheral layer is annealed.

4. The improvement defined in claim 2 in which said core has a preselected tensile strength and said peripheral layer has a tensile strength of approximately one-half said preselected strength.

5. The improvement defined in claim 2 in which said core has an outside diameter smaller than the interior of said sleeve and said peripheral layer has an outside diameter larger than the interior of the sleeve.

6. The improvement defined in claim 1 further including a central weakening recess in the end of said locking head.

7. The improvement defined in claim 6 further including an inturned annular flange partially closing said recess adjacent said end of said locking head.

8. The improvement defined in claim 1 in which the taper of said peripheral layer has a progressively increasing slope.

9. A blind rivet for joining a pair of side-by-side workpieces having aligned holes for receiving the rivet, said rivet comprising:
a tubular sleeve having a preformed head on one end;
a pin telescoped in said sleeve and having a pulling section forming one of its ends, said pin being adapted to be pulled through said sleeve to form a second head on the end of the sleeve opposite said first head for bearing against one side of said workpieces;
an expanding and locking head on said pin forming its end opposite said pulling section, said expanding and locking head having substantially concentric zones of varying hardness from a hard central core of relatively high tensile strength to an outer peripheral layer of annealed, softer and lower tensile strength material, said peripheral layer having a larger outside diameter than the interior of said sleeve whereby said peripheral layer is wire drawn as the pin is pulled into the sleeve; and
an expansion section on said pin between said sleeve and said expanding and locking head having a hardness greater than the outer peripheral layer and having a diameter less than that of said expanding and locking head but greater than the interior of said sleeve so as to expand the sleeve into engagement with the workpiece holes, said expanding and locking head having a taper toward said expansion section, a portion of which commencing with the end adjacent said expanding section is wire drawn to substantially the same diameter as the expansion section as the pin is pulled through the sleeve, said peripheral layer covering all of the sleeve-contacting and wire drawn portion of said taper.

10. The rivet defined in claim 9 in which said head has a cylindrical portion beyond said taper, both said taper and said cylindrical portion being peripherally annealed.

11. The rivet defined in claim 10 in which said cylindrical portion has a central cut-out weakening the head.

12. The rivet defined in claim 11 further including an internal annular flange partially closing said cut-out and strengthening the end of said expanding and locking head.

13. The rivet defined in claim 10 in which the end of said sleeve adjacent said expanding and locking head is annealed.

14. In a blind rivet for joining two side-by-side workpieces having aligned holes for receiving said rivet, the combination of:
a tubular sleeve having a blind end and an access end;
and a setting pin telescoped into said sleeve and projecting beyond both ends thereof, said setting pin having:
a central portion within the interior of said sleeve;
a pulling section projecting beyond said access end;
an expanding and locking head spaced outwardly beyond said blind end including a taper which is larger than the interior of the sleeve and is tapered toward said blind end of the sleeve;
and a shoulder between said taper and said blind end of the sleeve connecting said head to said central portion and tapered toward said blind end;
said head having a softened peripheral layer of relatively high ductility to be wire-drawn as said head is pulled into said sleeve, said peripheral layer extending axially of said pin from the end of said taper adjacent said central portion toward the free end of said head over the entire portion to be subjected to wire drawing, said head having a hardened central core extending from within said softened peripheral layer through said shoulder and into said central portion, and said shoulder having a hardness substantially greater than the hardness of said peripheral layer to enter said sleeve in advance of said peripheral layer and initiate expansion of said sleeve.

15. The combination defined in claim 14 including a central weakening recess in the free end of said head and extending inside said peripheral layer.

16. The combination defined in claim 15 further including an inturned annular flange partially closing said recess and strengthening said free end of said head.

17. The combination defined in claim 14 in which said taper flares progressively outwardly toward the free end of said head and thus progressively increases in slope.

* * * * *

PO-1050
(5/69)

UNITED STATES PATENT OFFICE
CERTIFICATE OF CORRECTION

Patent No. 3,657,957  Dated April 25, 1972

Inventor(s) GEORGE SIEBOL

It is certified that error appears in the above-identified patent and that said Letters Patent are hereby corrected as shown below:

Column 2, line 60, after "side" delete "!".

Column 3, line 9, delete "left" and insert therefor --right--.

Column 6, line 20, delete ",", first occurrence, and insert therefor --.--.

Signed and sealed this 28th day of November 1972.

(SEAL)
Attest:

EDWARD M.FLETCHER,JR.
Attesting Officer

ROBERT GOTTSCHALK
Commissioner of Patents